June 24, 1930. C. L. DREW 1,766,114
AUTOMOBILE REVERSE CONTROL MECHANISM
Filed May 21, 1929
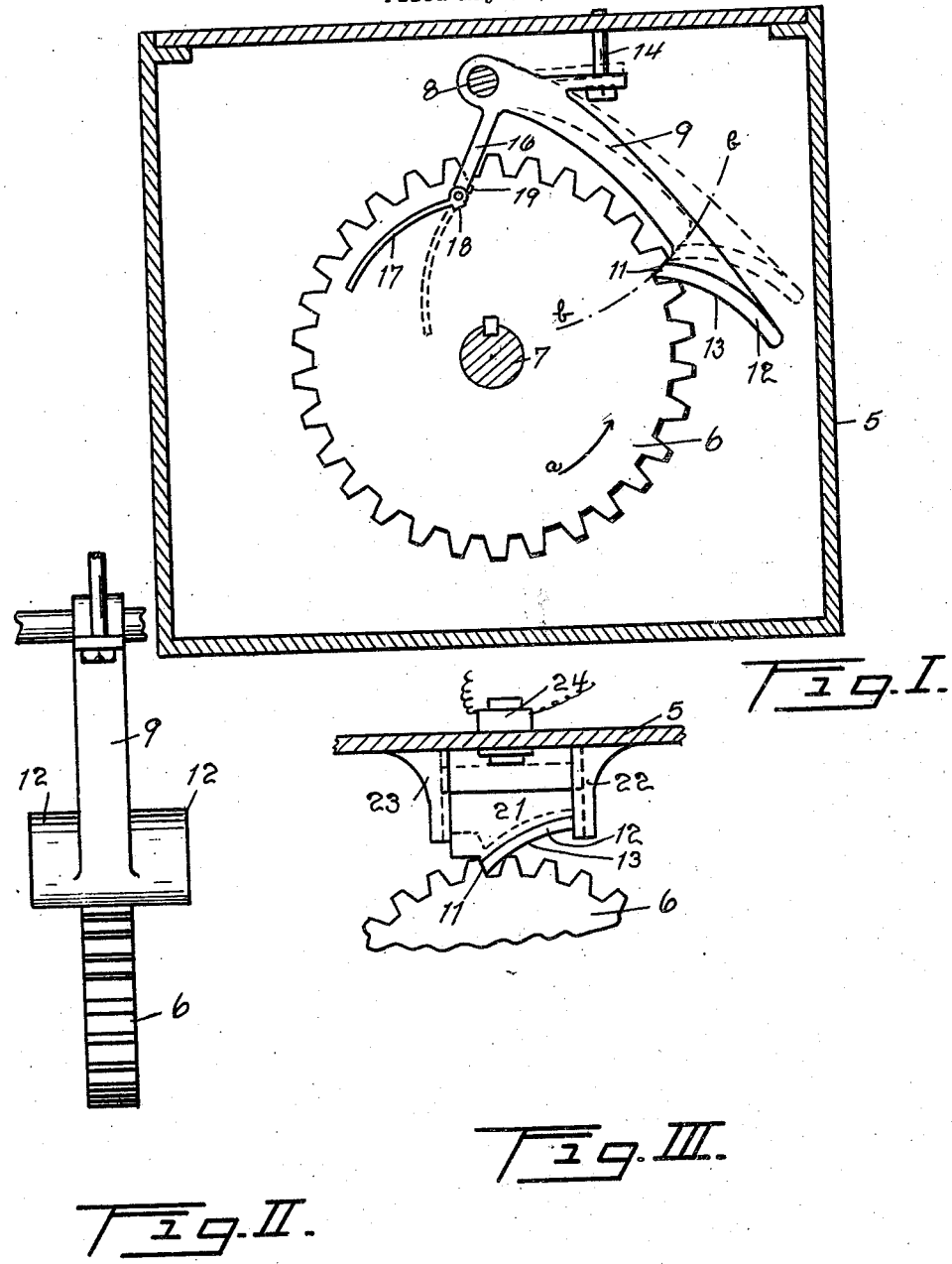
Fig. I.
Fig. II.
Fig. III.
INVENTOR.
Clayton L. Drew Patented June 24, 1930

1,766,114

UNITED STATES PATENT OFFICE

CLAYTON L. DREW, OF SAN FRANCISCO, CALIFORNIA

AUTOMOBILE REVERSE-CONTROL MECHANISM

Application filed May 21, 1929. Serial No. 364,864.

This invention relates to improvements in automobile reverse control mechanisms.

The principal object of this invention is to provide means for preventing an automobile or the like road vehicle from moving in a retrograde direction at times other than when it is desired to move rearwardly.

Another object of this invention is to provide a device of this character which is simple and one which may be attached to any automobile now upon the market without materially altering the construction of the same.

A further object is to produce a device of this character which will be silent in operation and positive in its action.

A still further object is to provide means whereby the device may be thrown out of operation when it is desired to move rearwardly.

A still further object is to provide means whereby the locking mechanism will not function until the car comes to rest, thus permitting rearward movement even after the gear shift lever has been moved from reverse position to neutral position.

Other objects and advantages will be apparent during the course of the following description.

In the accompanying drawings forming a part of this specification, and in which like numerals are employed to designate like parts throughout the same, Figure 1 is a front view of my device, having the face of the housing removed, in order to expose the interior mechanism thereof.

Figure 2 is a side elevation of the locking ratchet.

Figure 3 is a fragmentary detail view showing a modified form of my device.

Automobile brakes are generally so constructed that they do not function as efficiently when the car tends to move in a reverse direction as when the car moves in a forward direction. It therefore often happens that a car stopping upon a grade will start rolling rearwardly and soon get out of control with the result that serious accidents occur.

It also is a fact that when a car is stopped upon a grade, in order to again start forward, it is necessary to hold one foot upon the brake pedal and the other upon the clutch pedal, and in "getting away" it is then necessary to remove the foot from the clutch pedal slightly in advance of the foot upon the brake pedal. This means that the engine must overcome some of the retarding action upon the foot brake, as well as the grade.

I have therefore devised a simple mechanism which may be interposed at any point between the transmission and the rear wheels, which device will automatically prevent the car from moving in a retrograde direction except when it is desired to so move the automobile. This mechanism comprises a simple locking device which permits free movement in a forward direction and positively locks the driving mechanism to the frame of the car when the parts move in a retrograde direction.

Applicant is aware of the fact that reverse locking mechanisms have been employed for automobile use, but, so far as applicant can learn, these mechanisms have failed for several reasons.

First, when an over-running clutch is employed, the reverse action brings into play rollers riding upon a cam. In this case, the crushing effect upon the rollers is tremendous, which crushing effect causes the device to break down and to jam. Moreover, with this type of device, it is impossible to drive against a curb or a building and then back away, as it is necessary to move forwardly a few inches to permit the locking mechanism to release. In other words, if the operator moves up to a curb, so that the tires cause the vehicle to move backwardly from the curb again before coming to full rest, the reverse mechanism will lock and it is then impossible to move backwardly away from the curb, and this can only be accomplished by running up on to the curb (which condition is impossible if the vehicle happens to be against a high curb, a building or abutting the wall of a garage) and throwing the reverse lever into action.

With my device, the reverse lock can be unlocked at any time, irrespective of the position of the vehicle, and further, applicant has provided means whereby the reverse locking mechanism will not actuate, should the operator of the vehicle be moving rearwardly in reverse position and move his reverse lever to neutral position before the vehicle has come to rest.

With other types of locks, this condition would result in the immediate locking of the rearward motion of the vehicle, which would place tremendous strain upon the locking mechanism and the parts of the vehicle affected thereby. With my device, the locking ratchet will not drop until the car has come to rest, thus preventing any serious strain being placed upon any of the parts of the vehicle.

In the accompanying drawings, wherein for the purpose of illustration, is shown a preferred embodiment of my invention, the numeral 5 designates a casing, which may be the housing of the transmission, the differential gearing housing or an independent housing, the purpose of which is to surround a rotating gear 6. This gear is keyed or otherwise secured to the shaft 7, which, for the purpose of discussion, we will consider is the propeller shaft of a motor vehicle. The direction of rotation of the gear 6, when the vehicle is moving in a forward direction is indicated by the arrow a.

Pivoted, as at 8, is a locking ratchet 9, which has a nose 11, adapted to engage the surface of one of the teeth of the gear 6. The distance between the pivot 8 and the nose 11 is such that the arc b—b coincides with the face of the tooth against which the nose 11 contacts.

The free end of this locking ratchet has formed thereon wings 12, the under side of the wings forming a cam 13, the purpose of which will be later seen. In order to manually actuate the locking ratchet, I provide a pull rod 14, which is connected in any convenient manner to the reverse mechanism of the vehicle. An arm 16 is formed upon the ratchet 9, having pivoted thereto an auxiliary arm 17, which is provided with a lug 18 adapted to engage a lug 19 upon the arm 16.

In Figure 3, the construction and mode of operation is substantially the same, the only difference being that the ratchet 21 is slidable in guides 22 and 23 and is actuated through the medium of an electromagnet 24. The corresponding parts are given the same numerals in both views.

The manner of operation is, as follows:

Assuming that the device has been attached to a motor vehicle and that the housing 5 is partly filled with grease, such as is always present in a transmission mechanism or in a differential mechanism, rotation of the gear 6 in a counter-clockwise direction, as indicated by the arrow a, will cause the grease to be carried upwardly against the under surface of the wings 12 and hold the locking ratchet in the dotted line position of this figure.

The cam surface 13 will serve to give the latch its initial upward movement through being contacted by the teeth of the gear. This contacting will also cause a clicking noise, should the grease within the mechanism become exhausted, and will therefore act as a warning to place grease in the transmission. However, when the grease is present, the device is absolutely noiseless, as there is no physical contact between the gear and the locking ratchet while the gear is moving. When the car comes to rest the locking ratchet will drop and the nose 11 will engage one of the teeth of the gear.

As there is a straight line draw from the face of the nose to the pivot 8 and as this straight line draw is at right angles to the face of the tooth, it will be apparent that if the vehicle is in locked condition upon a hill and considerable retrograde force is tending to turn the gear 6 in a clock-wise direction, the same cannot take place until the locking ratchet 9 is actuated by the rod 14, which in turn is actuated by the reverse lever of the vehicle. This unlocking can take place very readily, even under this pressure, as the nose 11 may be slid over the face of the tooth of the gear with comparatively little effort, thus unlocking the vehicle and permitting it to move in a reverse direction.

As soon as the gear 6 commences to move in a reverse direction, the auxiliary arm 17 will move to the dotted line position, as the grease following the gear in this clock-wise direction will contact the auxiliary arm 17, moving it until the lug 18 abuts the lug 19, which will cause the arm 16 to hold the locking ratchet in elevated position and will not again permit the ratchet to function until the gear has come to rest.

It is of course understood that the auxiliary arm is not the medium by which the ratchet is held elevated during the entire reverse movement; the rod 14 serves that purpose, the auxiliary arm merely serving to maintain the ratchet elevated during that period, after which the operator releases the car from reverse gear until the car has come to rest.

I claim:

1. A locking device for preventing retrograde movement of a motor vehicle, having a rotating element, of a gravity actuated latch adapted to engage the rotating element, and fluid actuating means for holding said latch in suspended position out of contact with said rotating element when said rotating element is rotating in one direction only.

2. A locking device for preventing retrograde movement of a motor vehicle and including a rotating element rotating in a grease bath, a latching element adapted to engage said rotating element, means for moving said latching element out of engagement with said rotating element when said rotating element is moving in one direction only, said means comprising a contacting surface adapted to be impinged by grease thrown off by the centrifugal action of said rotating element.

3. A locking device for preventing retrograde movement of a motor vehicle and including a rotating element rotating in a grease bath, projections formed thereon, a latching element positioned adjacent said rotating element, a nose formed on said latching element and adapted to engage one of said projections of said rotating element when said rotating element is at rest, and means carried by said latching element for raising said nose out of engagement with the projections on said rotating element when said rotating element moves in one direction only, said means comprising a contacting surface adapted to be impinged by grease thrown by centrifugal force from said rotating element.

4. A locking device for preventing retrograde movement of a motor vehicle and including a rotating element rotating in a grease bath and having projections formed thereon, said device comprising a latching element having a nose adapted to engage the projections on said rotating element, and wings formed on said latching element whereby said latching element is held in suspended position out of engagement with said rotating element through the action of grease thrown by centrifugal force from said rotating element when said rotating element moves in one direction only.

5. A locking device for preventing retrograde movement of a motor vehicle and including a rotating element revolving in a grease bath and having projections formed thereon, a latching element having a nose thereon, said nose engaging the projections of said rotating element whereby retrograde movement of said rotating element is prevented, means carried on said latching element for raising said latching element out of contact with said rotating element when said rotating element is moved in one direction, said means comprising a surface formed on said latching element and adapted to be contacted by grease moved there-against by the action of said rotating element.

6. A locking device for preventing retrograde movement of a motor vehicle and including a rotating element revolving in a grease bath and adapted to normally rotate in one direction, a gravity actuated element comprising a pivoted member having a nose formed thereon engaging said revolving element to prevent retrograde movement thereof, and a contacting surface formed on said gravity latch whereby the rotation of said revolving element will cause the grease to contact said surface and maintain said latch out of engagement with the rotating element during rotation thereof in one direction only.

7. A locking device for preventing retrograde movement of a motor vehicle and including a rotating element normally revolving in one direction in a grease bath, a gravity actuated element comprising a pivoted member having a nose formed thereon engaging with said rotating element to prevent retrograde movement thereof, and a contacting surface formed on said gravity latch whereby the rotation of said revolving element forces the grease to contact said surface and maintain said latch out of engagement with said rotating element during rotation thereof in one direction only, and means for manually moving said latch out of engagement with said rotating element.

8. A locking device for preventing retrograde movement of a motor vehicle and including a rotating element normally revolving in one direction in a grease bath, a gravity actuated element comprising a pivoted member having a nose formed thereon, engaging with said rotating element to prevent retrograde movement thereof, a contacting surface formed on said gravity latch whereby the rotation of said revolving element in its bath will cause the grease to contact said surface and maintain said latch out of engagement with the rotating element during rotation thereof in one direction only, means for manually moving said latch out of engagement with said rotating element and grease actuated means carried by said latch for holding said latch out of engagement with said revolving element while said rotating element is moving in a retrograde direction.

9. A locking device for preventing retrograde movement of a motor vehicle and including a rotating element normally rotating in one direction and revolving in a grease bath, a gravity actuated element comprising a pivoted member having a nose formed thereon, engaging with said rotating element to prevent retrograde movement thereof, a contacting surface formed on said gravity latch whereby the rotation of said rotating element in its bath will cause the grease to contact said surface and maintain said latch out of engagement with the rotating element during rotation thereof in one direction only, means for manually moving said latch out of engagement with said rotating element, and grease actuated means carried by said latch for holding said latch out of engagement with said rotating element while said rotating element is moving in a retrograde direction, said means comprising an arm formed on said latch and an auxiliary arm pivoted thereto in the manner and for the purpose described.

10. In combination with a rotating part of a motor vehicle of a fluid controlled mechanism, associated with the rotating part, for preventing retrograde movement of the motor vehicle, and an auxiliary means carried by said mechanism for maintaining said mechanism inoperative after said rotating part has been caused to move in a retrograde direction.

In testimony whereof I affix my signature.

CLAYTON L. DREW.